United States Patent
Cassiano Gaspar et al.

(10) Patent No.: US 12,371,539 B2
(45) Date of Patent: Jul. 29, 2025

(54) USE OF A COPOLYAMIDE COMPOSITION AS A MATRIX OF FILLER MATERIAL WITH GLASS FIBRES HAVING A CIRCULAR CROSS SECTION FOR LIMITING WARPING

(71) Applicant: ARKEMA FRANCE, Colombes (FR)

(72) Inventors: Stefania Cassiano Gaspar, Bernay (FR); Benoit Brule, Beaumont-le-Roger (FR)

(73) Assignee: ARKEMA FRANCE, Puteaux (FR)

( * ) Notice: Subject to any disclaimer, the term of this patent is extended or adjusted under 35 U.S.C. 154(b) by 0 days.

(21) Appl. No.: 18/417,290

(22) Filed: Jan. 19, 2024

(65) Prior Publication Data

US 2024/0158588 A1    May 16, 2024

Related U.S. Application Data

(62) Division of application No. 16/649,737, filed as application No. PCT/FR2018/052327 on Sep. 24, 2018, now Pat. No. 11,912,836.

(30) Foreign Application Priority Data

Sep. 25, 2017 (FR) ..................... 17.58829

(51) Int. Cl.
| | | |
|---|---|---|
| C08J 5/04 | (2006.01) | |
| C08G 69/26 | (2006.01) | |
| C08L 77/06 | (2006.01) | |

(52) U.S. Cl.
CPC ............ C08J 5/043 (2013.01); C08G 69/265 (2013.01); C08L 77/06 (2013.01); *C08J 2377/06* (2013.01)

(58) Field of Classification Search
CPC ............ C08G 69/36; C08J 5/043; C08K 7/14
See application file for complete search history.

(56) References Cited

U.S. PATENT DOCUMENTS

| | | | |
|---|---|---|---|
| 9,242,892 | B2 | 1/2016 | Nonaka et al. |
| 9,890,283 | B2 | 2/2018 | Brule et al. |
| 2008/0274355 | A1 | 11/2008 | Hewel |
| 2009/0280311 | A1 | 11/2009 | Kumazawa et al. |
| 2010/0227122 | A1 | 9/2010 | Kumazawa et al. |
| 2010/0249292 | A1 | 9/2010 | Saga et al. |
| 2010/0279111 | A1 | 11/2010 | Philipp et al. |
| 2011/0105655 | A1 | 5/2011 | Harder et al. |
| 2011/0105697 | A1 | 5/2011 | Buhler et al. |
| 2011/0144257 | A1 | 6/2011 | Mathew |
| 2011/0190433 | A1 | 8/2011 | Doshi et al. |
| 2015/0080516 | A1 | 3/2015 | Kumazawa et al. |
| 2015/0175744 | A1 | 6/2015 | Ieda et al. |
| 2018/0171140 | A1 | 6/2018 | Fernagut et al. |
| 2018/0291202 | A1 | 10/2018 | Deyrail et al. |

FOREIGN PATENT DOCUMENTS

| | | |
|---|---|---|
| CN | 101432364 A | 5/2009 |
| CN | 102076770 A | 5/2011 |
| CN | 102378784 A | 3/2012 |
| CN | 102675863 A | 9/2012 |
| CN | 104428346 A | 3/2015 |
| CN | 104945897 A | 9/2015 |
| CN | 106987119 A | 7/2017 |
| EP | 2028231 A1 | 2/2009 |
| FR | 3041354 A1 | 3/2017 |
| JP | 2011-068874 A | 4/2011 |
| JP | 2013-518175 A | 5/2013 |
| JP | 5523520 B2 | 6/2014 |
| JP | 2015528521 A | 9/2015 |

OTHER PUBLICATIONS

International Search Report and Written Opinion received for PCT Patent Application No. PCT/FR2018/052327, mailed on Jan. 2, 2019, 23 pages (11 pages of English Translation and 12 pages of original Document).
Notice of Allowance received for Chinese Patent Application No. 201880061594, mailed on Jan. 11, 2022, 4 pages (2 pages of English Translation and 2 pages of Original Document).
Office Action received for Chinese Patent Application No. 201880061594, mailed on Jun. 16, 2021, 14 pages (7 pages of English Translation and 7 pages of Original Document).
Office Action received for Korean Patent Application No. 10-2020-7008398, mailed on May 11, 2023, 14 pages (8 pages of English Translation and 6 pages of Original Document).
Office Action with English translation mailed on Sep. 9, 2024, by the Japanese Patent Office (JPO) for Japanese Application No. (2023-035549), 6 pages.

*Primary Examiner* — Ana L. Woodward
(74) *Attorney, Agent, or Firm* — Boone IP Law (57) ABSTRACT

The invention relates to the use of a composition comprising at least one semi-crystalline copolyamide A/X1Y in which: —A is a repeat unit obtained from the polycondensation of at least one C6 to C12 lactam, or at least one repeat unit XY obtained from the polycondensation of at least one aliphatic C4 to C18 diamine (X), and of at least one aliphatic C6 to C18, in particular C6 to C12, dicarboxylic acid (Y), —X1Y is a repeat unit obtained from the polycondensation of a diamine (X1) chosen from an arylamine, a cycloaliphatic diamine and a branched aliphatic diamine and of at least one aliphatic dicarboxylic acid (Y) identical to that of the unit XY, the A/X1Y weight ratio being from 60/40 to 95/5, glass fibres having a circular cross section, and optionally at least one impact modifier and/or at least one additive, for limiting warping while at the same time maintaining the cycle time of the obtained composition suitable for processing thereof, in particular by injection moulding.

20 Claims, 1 Drawing Sheet

A B

USE OF A COPOLYAMIDE COMPOSITION AS A MATRIX OF FILLER MATERIAL WITH GLASS FIBRES HAVING A CIRCULAR CROSS SECTION FOR LIMITING WARPING

CROSS REFERENCE TO RELATED APPLICATIONS

The present application is a divisional of U.S. application Ser. No. 16/649,737, filed on Mar. 23, 2020, which is a U.S. national stage of International Application No. PCT/FR2018/052327, filed on Sep. 24, 2018, which claims the benefit of French Application No. 1758829, filed on Sep. 25, 2017. The entire contents of each of U.S. application Ser. No. 16/649,737, International Application No. PCT/FR2018/052327, French Application No. 1758829 are hereby incorporated herein by reference in their entirety.

The present invention relates to the use of a semi-crystalline copolyamide, particularly a branched semi-arylaliphatic, semi-alicyclic or semi-aliphatic copolyamide, as a matrix of a material charged with fiberglass with a circular cross-section, to limit warping while maintaining the cycle time of the composition obtained suitable for its use. It also relates to the composition obtained and its use to form a single-layer structure or at least one layer of a multilayer structure, in particular in the domain of electrics and/or electronics (E/E).

Many applications in the E/E domain request very hard materials (telephone shells, computer parts, etc.). Rigidity is even more important as the market trend is towards reducing weight in electronic equipment and therefore towards reducing the thickness of parts.

However, making thin parts leads to other problems: capacity to be injected, particularly materials that are sufficiently fluid to completely fill the mold and especially to respect the stability of the parts (no warping: major problem with these hard materials obtained by the addition of the fiberglass). The transformation (for example by injection) should also occur within the transformation time, in particular the cycle times suitable for an industrial process.

The warping is caused by internal constraints whose consequence (or relaxation) is the deformation of the part. In the case of highly charged materials, the orientation of fibers in the sense of flow has the consequence of limiting shrinkage in this direction. By contrast, in the direction perpendicular to the fiber axis, shrinkage is controlled by the polymer and is therefore greater. This differential shrinkage is the main source of warping. The case of polymers reinforced by high fiberglass contents is clearly the example for which the warping aspect is critical.

In these applications, rigid (modulus>12 GPa) polyamides (PA) are widely used. But as soon as the fiber content is greater than 25%, the use of fibers with non-circular or flat (FF) cross-section is the solution chosen to meet all of the specifications, and particularly to limit the warping of fine injected parts.

Accordingly, application EP2789591, in paragraph [0003], indicates that the fiberglass with a non-circular cross-section does not improve the mechanical properties, the dimensional stability or the warping of resins reinforced with said fiberglass with a non-circular section. According to this application, in terms of the improvement of mechanical properties, this is due to fiberglass with a non-circular section having a greater contact surface area than that of fibers with a circular cross-section. In terms of the improvement of the dimensional stability and warping, this is due, still according to application EP2789591, to fiberglass with a non-circular section being oriented less in the sense of flow than fiberglass with a circular cross-section and tending, consequently, to be oriented more two-dimensionally than a fiberglass with circular cross-section in the injected part.

Similarly, application US 2011/0105655 describes compositions having low distortion during molding and formed of 25 to 72% by weight of a polyamide, from 20 to 65% by weight of fiberglass with flat cross-section having L/D ratio from 2 to 8, and from 8 to 25% by weight of a flame retardant (where L represents the large dimension of the cross-section of the fiber and D the small dimension of the cross-section of said fiber). The polyamide used is a mixture from 55-90% by weight of an aliphatic polyamide and from 10 to 45% by weight of another polyamide that can be MXD6 relative to the total sum of the polyamides.

Also, application US 2010/279111 describes compositions also having a low distortion during molding formed from 30 to 80% by weight of a polyamide and from 20 to 70% of long fiberglass with a flat cross-section having L/D ratio from 2 to 8. The polyamide used is either a mixture of 55 to 85% by weight of an aliphatic polyamide and from 15 to 45% by weight of a polyamide that can be MXD6 relative to the total sum of the polyamides, or a mixture of 55 to 85% by weight of an aliphatic polyamide and from 15 to 45% by weight of a copolyamide comprising one or more polyamides, for example MXDI or MXD6 and at least one other polyamide chosen from PA 66, 610, 6 and 12, relative to the total sum of polyamides.

Patent JP5523520 describes polyamide granules having electric properties and resistance to deformation.

The granules are formed of 5-40 parts by weight of a flame retardant, from 5-200 parts by weight of a fiberglass with a flat cross-section with a L/D ratio of at least 2.3 and from 0-40 parts by weight of a polyamide, which can be a mixture of aliphatic polyamide with a semi-aromatic polyamide such as MXD10.

Nevertheless, the use of fiberglass with a flat cross-section causes a non-negligible cost relative to fiberglass with a circular cross-section. What is more, suppliers of fiberglass with a flat cross-section are much less common than suppliers of fiberglass with a circular cross-section. These two aspects are essential in the scope of industrial production of resins reinforced with fiberglass. Document EP 1972659 describes compositions and articles for portable electronic devices. The examples presented show that compositions containing mixtures of polyamides PA66 and MXD6, with a majority of MXD6 (example 1), are devoid of warping when fiberglass with a flat cross-section is used. By contrast, when fiberglass with a circular cross-section is used (comparison example 2), the compositions present substantial warping. This document does not refer to cycle time.

Moreover, document EP 2456822 teaches that compositions containing MXD10, although they present a good modulus, need however a high mold temperature during shaping by injection-molding to ensure maximum crystallization of the product and therefore confer optimal mechanical properties and dimensional stability.

It is therefore necessary to be able to have compositions using fiberglass with a circular cross-section and a copolyamide matrix, thereby limiting the cost of said composition and ensuring a permanent supply of fiberglass with a circular cross-section while limiting its drawback, i.e. in particular the warping caused by the fiberglass when compositions containing more than 25% of fiberglass are used, and by maintaining sufficiently fast crystallization kinetics for the matrix to have sufficiently short transformation times, in particular sufficiently short cycle times during injection, and easy demolding.

These various problems have been solved by specific semi-crystalline copolyamides, particularly branched semi-arylaliphatic, semi-alicyclic or semi-aliphatic copolyamides, as a matrix of a material charged with fiberglass with a circular cross-section.

The present invention therefore relates to the use of a composition comprising at least one semi-crystalline copolyamide $A/X_1Y$ wherein:

A is a repeating unit obtained from the polycondensation of at least one $C_6$ to $C_{12}$, preferably $C_{12}$, lactam or of at least one $C_6$ to $C_{12}$, preferably $C_{11}$, amino acid or at least one repeating unit XY obtained from the polycondensation of at least one $C_4$ to $C_{18}$, particularly $C_4$ to $C_{12}$, aliphatic diamine (X) and at least one $C_6$ to $C_{18}$, particularly $C_6$ to $C_{12}$, aliphatic dicarboxylic acid (Y), $X_1Y$ is a repeating unit obtained from the polycondensation of a diamine ($X_1$) chosen from an arylamine, a cycloaliphatic diamine and a branched aliphatic diamine, and at least one aliphatic dicarboxylic acid (Y) identical to that of unit XY, the $A/X_1Y$ ratio by weight being comprised from 60/40 to 95/5, fiberglass with a circular cross-section, and optionally at least one impact modifier and/or at least one additive, to limit warping while maintaining the cycle time of the composition obtained suitable for its use, particularly by injection.

The aliphatic dicarboxylic acid (Y) is therefore as defined above, $C_6$ to $C_{18}$, particularly $C_6$ to $C_{12}$ in the case where A is obtained from the polycondensation of at least one lactam or at least one amino acid. When A is a unit XY, Y in the unit $X_1Y$ is as defined above and, what is more, identical to that of unit XY.

In other words, the present invention relates to the use of a composition comprising at least one semi-crystalline copolyamide $A/X_1Y$ wherein:

A is a repeating unit obtained from the polycondensation of at least one $C_6$ to $C_{12}$, preferably $C_{12}$, lactam or of at least one $C_6$ to $C_{12}$, preferably $C_{11}$, amino acid or at least one repeating unit XY obtained from the polycondensation of at least one $C_4$ to $C_{18}$, particularly $C_4$ to $C_{12}$, aliphatic diamine (X) and at least one $C_6$ to $C_{18}$, particularly $C_6$ to $C_{12}$, aliphatic dicarboxylic acid (Y), $X_1Y$ is a repeating unit obtained from the polycondensation of a diamine ($X_1$) chosen from an arylamine, a cycloaliphatic diamine and a branched aliphatic diamine, and at least one aliphatic dicarboxylic acid (Y) as defined above and identical to that of unit XY when A is a unit XY, the $A/X_1Y$ ratio by weight being comprised from 60/40 to 95/5, fiberglass with a circular cross-section, and optionally at least one impact modifier and/or at least one additive, to limit warping in an article coming from said composition while maintaining the cycle time of the composition obtained suitable for its use for the preparation of said article, particularly by injection. Advantageously, cyclohexane dicarboxylic acid is excluded from the definition of the dicarboxylic aliphatic acid (Y).

In the entire description, the expression comprised . . . to . . . means that the limits are included.

The inventors have found in an unexpected manner that the presence of a repeating unit $X_1Y$ containing a branched arylaliphatic, cycloaliphatic or aliphatic diamine, in a specific mass proportion in a composition comprising a semi-crystalline copolyamide $A/X_1Y$ and fiberglass with a circular cross-section, limited not only the warping of an article coming from said composition of the composition relative to the linear aliphatic polyamide A alone during the use, particularly by injection, of the composition, but also maintained a suitable cycle time during use, while avoiding the problems of ejection from the mold associated with incomplete crystallization of the composition.

A semi-crystalline copolyamide, in the sense of the invention, denotes a copolyamide that has a melting temperature (Tm) by DSC according to ISO standard 11357-3:2013, and a crystallization enthalpy during the cooling step at a rate of 20 K/min by DSC measured according to ISO standard 11357-3 of 2013 greater than 30 J/g, preferably greater than 40 J/g.

The nomenclature used to define the polyamides is described in ISO standard 1874-1:2011 "Plastiques—Materiaux polyamides (PA) pour moulage et extrusion—Partie 1: Designation", in particular on page 3 (Tables 1 and 2) and is well known to the person skilled in the art.

When the repeating unit A of said copolyamide is obtained from the polycondensation of a lactam, said lactam can be chosen from pyrrolidinone, 2-piperidinone, caprolactam, enantholactam, caprylolactam, pelargolactam, decanolactam, undecanolactam, and lauryl lactam, particularly lauryl lactam.

When the repeating unit A of said copolyamide is obtained from the polycondensation of an amino acid, it can be chosen from 9-aminononanoic acid, 10-aminodecanoic acid, 10-aminoundecanoic acid, 12-aminododecanoic acid and 11-aminoundecanoic acid and derivatives thereof, in particular N-heptyl-11-aminoundecanoic acid, particularly 11-aminoundecanoic acid. When the repeating unit A of said copolyamide is obtained from the polycondensation of a repeating unit XY, the $C_4$ to $C_{18}$ diamine (X) used in polyamide XY is a linear aliphatic diamine, and can be particularly chosen from 1,4-butanediamine, 1,5-pentamethylene diamine, 1,6-hexamethylene diamine 1,7-heptamethylediamine, 1,8-octamethylediamine, 1,9-nonamethylediamine, 1,10-decamethylediamine, 1,11-undecamethylediamine, 1,12-dodecamethylediamine, 1,13-tridecamethylediamine, the 1,14-tetradecamethylediamine, 1,16-hexadecamethylediamine and the 1,18-octadecamethylediamine.

Advantageously, the diamine (X) used is a $C_4$ to $C_{12}$ diamine, particularly chosen from 1,4-butanediamine, 1,5-pentamethylediamine, 1,6-hexamethylene diamine, 1,7-heptamethylediamine, 1,8-octamethylediamine, 1,9-nonamethylediamine, 1,10-decamethylediamine, 1,11-undecamethylediamine, 1,12-dodecamethylediamine.

Advantageously, the diamine (X) used is a $C_6$ to $C_{10}$ diamine, particularly chosen from 1,6-hexamethylene diamine, 1,7-heptamethylediamine, 1,8-octamethylediamine, 1,9-nonamethylediamine, 1,10-decamethylediamine.

When the repeating unit A of said copolyamide is obtained from the polycondensation of a repeating unit XY, the $C_6$ to $C_{18}$ aliphatic dicarboxylic acid (Y) can be chosen from adipic acid, suberic acid, azelaic acid, sebacic acid, undecanedioic acid, dodecanedioic acid, brassylic acid, tetradecanedioic acid, pentadecanedioic acid, hexadecanedioic acid, octadecanedioic acid. Advantageously, the aliphatic dicarboxylic acid (Y) is a $C_6$ to $C_{12}$ acid and can be chosen from adipic acid, suberic acid, azelaic acid, sebacic acid, undecanedioic acid, dodecanedioic acid.

The aliphatic diamine (X) can be mixed with one or more other aliphatic diamines X'.

In the same manner, the aliphatic dicarboxylic acid (Y) can be mixed with one or more other aliphatic dicarboxylic acids Y'.

It is clearly obvious in the latter two cases that the repeating unit XY containing X' and/or Y' is in any case in a mass proportion greater than or equal to 60%.

By contrast, a mixture of repeating aliphatic unit XY with one or more repeating units coming from the polycondensation of lactams or amino acids is excluded from the scope of the invention. As for the repeating unit $X_1Y$, the diamine ($X_1$) is chosen from a branched arylamine, a cycloaliphatic diamine, and an aliphatic diamine.

When the diamine ($X_1$) is an arylamine, it can be chosen from meta-xylylene diamine (MXD, CAS No. 1477-55-0) or para-xylylene diamine (PXD, CAS No. 539-48-0).

When the cycloaliphatic diamine ($X_1$) is a cycloaliphatic diamine, it can be chosen from bis(3,5-dialkyl-4-aminocyclohexyl)-methane, bis(3,5-dialkyl-4-aminocyclohexyl)ethane, bis(3,5-dialkyl-4-aminocyclohexyl)-propane, bis(3,5-dialkyl-4-aminocyclo-hexyl)-butane, bis-(3-methyl-4-aminocyclohexyl)-methane or 3,3'-dimethyl-4,4'-diaminodicyclohexyl-methane commonly called "BMACM" or "MACM" (and denoted B below), p-bis(aminocyclohexyl)-methane commonly called "PACM" (and denoted P below), particularly Dicykan®, isopropylidenedi(cyclohexylamine) commonly called "PACP," isophorone-diamine (denoted IPD below) and 2,6-bis(amino methyl)norbornane commonly called "BAMN," and bis(aminomethyl)cyclohexane "BAC."

When this diamine ($X_1$) is a branched aliphatic diamine, it comes from an aliphatic diamine presenting a main linear chain comprising at least 4 carbon atoms and including one or more substituents, in particular methyl and/or ethyl.

It can in particular be 2-methyl pentamethylene diamine (MPMD), 2-methyl-1,8-octamethylene diamine (MOMD) or trimethylene (2,2,4 or 2,4,4) hexamethylene diamine (TMDA). The dicarboxylic acid (Y) of the repeating unit $X_1Y$ is identical to that of the repeating unit XY and therefore as defined above.

However, when the dicarboxylic acid of the repeating unit XY is mixed with another dicarboxylic acid Y' as described above, then the repeating unit XY' is in a minority mass proportion relative to the sum of XY and XY'.

Advantageously, the mass ratio XY/XY' is comprised from 90/10 to 99.9/0.1.

In the same way, when the dicarboxylic acid of repeating unit $X_1Y$ is mixed with another dicarboxylic acid Y' as described above, then the repeating unit $X_1Y'$ is in a minority mass proportion relative to the sum of $X_1Y$ and $X_1Y'$.

Advantageously, the mass ratio $X_1Y/X_1Y'$ is comprised from 90/10 to 99.9/0.1.

The ratio by weight $A/X_1Y$ is comprised from 60/40 to 95/5.

Beyond 40% by weight of $X_1Y$, the composition presents difficulties for use and in particular difficulties in ejection from the mold, a long cycle time because of the too slow crystallization because it is too affected by the monomer content and is in particular incomplete.

Below 5% by weight of $X_1Y$, the composition presents warping.

Advantageously, the ratio by weight $A/X_1Y$ is comprised from 70/30 to 95/5.

In the sense of the invention, fiberglass is understood to be any fiberglass, in particular that described by Frederick T. Wallenberger, James C. Watson and Hong Li, PPG industries Inc. (ASM Handbook, Vol 21: composites (#06781G), 2001 ASM International), provided that said fiber has a circular cross-section.

Advantageously, said fiberglass presents a L/D ratio (where L represents the large dimension of the cross-section of the fiber and D the small dimension of the cross-section of said fiber) less than 2, particularly less than 1.5.

Advantageously, the ratio L/D is equal to about 1 and the diameter is comprised from 4 μm to less than 25 μm, preferably from 4 to 15 μm.

The expression "impact modifier" must be understood to mean a polymer containing polyolefin having a flexural modulus less than 100 MPa measured at 23° C. according to standard ISO 178:2010 and Tg less than 0° C. (measured according to standard 11357-2 at the inflexion point of the DSC thermogram), particularly a polyolefin, coupled or not with a PEBA (polyether-block-amide) having a flexural modulus of <200 MPa. Using a single PEBA as impact modifier in the composition would not fall outside the scope of the invention.

The polyolefin of the impact modifier can be functionalized or non-functionalized or be a mixture of at least one functionalized polyolefin and/or least one non-functionalized polyolefin.

In particular, a part or all of the polyolefins carries a function chosen from carboxylic acid, carboxylic anhydride and epoxide functions, and is particularly chosen from an ethylene and propylene copolymer with elastomeric character (EPR), an ethylene-propylene-diene copolymer with elastomer character (EPDM) and an ethylene/alkyl (meth)acrylate copolymer, a higher ethylene-alkene copolymer, particularly an ethylene-octene copolymer, an ethylene-alkyl acrylate-maleic anhydride terpolymer.

Advantageously, the impact modifier is chosen from Fusabond F493, a Pebax®, particularly Pebax® 40R53 SP01, a Lotader®, particularly Lotader® 5500 or Lotader® 7500, Exxelor® VA1803, or a mixture of these, in which case they are in a ratio ranging from 0.1/99.9 to 99.9/0.1, preferably 1/2 to 2/1 when they are in a mixture of two.

As an example, the impact modifier is chosen from the following mixtures: Fusabond® 493/Lotader®, particularly Fusabond® 493/Lotader® 5500 or Fusabond® 493/Lotader® 7500. The impact modifier can also be a core-shell modifier, also denoted a core-shell polymer.

The "core-shell modifier" is presented in the form of fine particles having an elastomer core and at least one thermoplastic shell; the particle size is generally less than a μm and advantageously inclusively between 150 and 500 nm.

The "core-shell type modifier" has an acrylic or butadiene base by contrast with the impact modifier, which has a polyolefin base.

Advantageously, the proportion of impact modifier is comprised from 0 to 10% by weight relative to the total weight of the composition.

The additives optionally used in the composition of the invention are the classic additives used in polyamides and well know to the person skilled in the art such as fillers, colorants, stabilizers, plasticizers, surfactants, nucleating agents, pigments, whitening agents, antioxidants, lubricants, flame retardants, waxes and mixtures thereof.

In the entire description, the term "filler" excludes fiberglass in any form at all.

The expression "limit warping" means that the warping is less than 1.5 mm, particularly less than 1 mm, as determined on 100*100*1 mm 3 plates, 7 days after the transformation. Warping can be completely suppressed but generally, it is less than 1.5 mm, particularly less than 1 mm.

The expression "while maintaining the cycle time of the composition obtained suitable for its use" means that the time necessary to make a part from the composition of the invention is not too long.

Specifically, the cycle time by injection comprising the steps of injection, cooling, mold opening and ejection of the product formed, occurs in less than 50 seconds, preferably in less than 40 seconds, in particular less than 30 seconds.

It would not be outside the scope of the invention if the implementation was by means of compression molding.

Advantageously, the present invention relates to the use of a composition comprising at least one semi-crystalline copolyamide $A/X_1Y$ wherein:

A is a repeating unit obtained from the polycondensation of a $C_6$ to $C_{12}$, preferably Cu, lactam or a $C_6$ to $C_{12}$, preferably $C_{11}$, amino acid or a repeating unit XY obtained from the polycondensation of a $C_4$ to $C_{18}$, particularly $C_4$ to $C_{12}$, aliphatic diamine (X) and a $C_6$ to $C_{18}$, particularly $C_6$ to $C_{12}$, aliphatic dicarboxylic acid (Y), $X_1Y$ is a repeating unit obtained from the polycondensation of a diamine ($X_1$) chosen from an arylamine, a cycloaliphatic diamine and a branched aliphatic diamine, and at least one aliphatic dicarboxylic acid (Y) identical to that of unit XY, the $A/X_1Y$ ratio by weight being comprised from 60/40 to 95/5, fiberglass with a circular cross-section, and optionally at least one impact modifier and/or at least one additive, to limit warping while maintaining the cycle time of the composition obtained suitable for its use, particularly by injection.

The various repeating units are as defined above with the difference that the repeating unit A is obtained from the polycondensation of a single lactam, or of a single amino acid or of a single unit XY and that the unit $X_1Y$ also corresponds to a single repeating unit.

Consequently, the copolyamide in this embodiment is formed only of two repeating units.

Advantageously, the present invention relates to the use of a composition as defined above characterized in that said composition comprises:

from 25 to 65% by weight, particularly from 35 to 65% of said at least one copolyamide $A/X_1Y$, from 35 to 75% by weight, particularly from 35 to 65% by weight of fiberglass with a circular cross-section, from 0 to 10% by weight of at least one impact modifier, from 0 to 2% by weight of at least one additive, the sum of the proportions of each constituent of the composition being equal to 100%.

In one embodiment, said arylamine of the $X_1Y$ unit of said copolyamide of said composition is chosen from meta-xylylene diamine (MXD) and para-xylylene diamine (PXD). In another embodiment, said cycloaliphatic diamine of the $X_1Y$ unit of said copolyamide of said composition is chosen from bis(aminomethyl)cyclohexane (BAC), 3,3'-dimethyl-4,4'-diamino-dicyclohexyl-methane, commonly called (BMACM) or (MACM), and bis-(p-aminocyclohexyl)-methane, commonly called (PACM).

The BAC may be 1,3-BAC or 1,4-BAC.

In another embodiment, said cycloaliphatic diamine of the $X_1Y$ unit of said copolyamide of said composition is bis (aminomethyl)cyclohexane (BAC).

The BAC may be 1,3-BAC or 1,4-BAC.

1,3-BAC (or 1,3 bis(aminomethyl)cyclohexane, CAS No. 2579-20-6) is a cycloaliphatic diamine monomer obtained in particular by the hydrogenation of meta-xylene diamine (MXD). 1,3-BAC exists in the form of two isomers, cis and trans, where CAS No. 2579-20-6 corresponds to a mixture of isomers.

1,4-BAC (or 1,4 bis(aminomethyl)cyclohexane, CAS No. 2549-07-9) is a cycloaliphatic diamine monomer obtained in particular by the hydrogenation of para-xylene diamine (PXD). 1,4-BAC exists in the form of two isomers, cis and trans, where CAS No. 2549-07-9 corresponds to a mixture of isomers.

Advantageously, the 1,3 BAC or 1,4 BAC used in the composition of the invention is a mixture of cis and trans isomers in respective proportions of 0.1/99.9 to 99.9/0.1, in particular from 75/25 to 25/75.

It is of course understood that when 1,3-BAC or 1,4-BAC used in the composition of the invention is a mixture of cis and trans isomers, this does not correspond to a mixture of diamines $X_1$ but to a single diamine $X_1$.

Advantageously, the proportion of cis isomer in the 1,3 BAC is greater than 60%, preferably greater than 70%, particularly greater than 80%, in particular greater than 90%.

Advantageously, the proportion of trans isomer in the 1,4 BAC is greater than 60%, preferably greater than 70%, particularly greater than 80%, in particular greater than 90%. In another embodiment, said branched aliphatic diamine is chosen from 2-methyloctanediamine (MOMD), methylpentamethylene diamine (MPMD) and trimethylhexanemethylene diamine (TMDA).

In an advantageous embodiment, said diamine ($X_1$) is chosen from meta-xylylene diamine (MXD), para-xylylene diamine (MPMD), bis(aminomethyl)cyclohexane (BAC) and methylpentamethylene diamine (MPMD)

Advantageously, A is a repeating unit XY.

Advantageously, A is a repeating unit XY and said diamine ($X_1$) is chosen from meta-xylylene diamine (MXD), para-xylylene diamine (PXD), bis(aminomethyl)cyclohexane (BAC) and methylpentamethylene diamine (MPMD).

In one embodiment, A is a repeating unit XY and (Y) is a $C_6$ to Cie aliphatic dicarboxylic acid (Y), particularly (Y) corresponds to sebacic acid.

Advantageously, A is a repeating unit XY, (Y) being a $C_6$ to $C_{12}$ aliphatic dicarboxylic acid (Y) and said diamine ($X_1$) is chosen from meta-xylylene diamine (MXD), para-xylylene diamine (PXD), bis(aminomethyl)cyclohexane (BAC) and methylpentamethylene diamine (MPMD).

Advantageously, A is a repeating unit XY, (Y) corresponds to sebacic acid and said diamine ($X_1$) is chosen from meta-xylylene diamine (MXD), para-xylylene diamine (PXD), bis(aminomethyl)cyclohexane (BAC) and methylpentamethylene diamine (MPMD).

In one embodiment, (X) corresponds to a $C_6$ to $C_{12}$ diamine, particularly hexamethylene diamine or decanediamine.

Advantageously, A is a repeating unit XY, (Y) being a $C_6$ to $C_{12}$ aliphatic dicarboxylic acid (Y) and (X) corresponds to a $C_6$ to $C_{12}$ diamine.

Advantageously, A is a repeating unit XY, (Y) being a $C_6$ to $C_{12}$ aliphatic dicarboxylic acid (Y) and (X) corresponds to hexamethylene diamine or decanediamine.

Advantageously, A is a repeating unit XY, (Y) being a $C_6$ to $C_{12}$ aliphatic dicarboxylic acid (Y), (X) corresponds to a $C_6$ to $C_{12}$ diamine and said diamine ($X_1$) is chosen from meta-xylylene diamine (MXD), para-xylylene diamine (PXD), bis(aminomethyl)cyclohexane (BAC) and methylpentamethylene diamine (MPMD).

Advantageously, A is a repeating unit XY, (Y) being sebacic acid or dodecanedioic acid, (X) corresponds to a $C_6$ to $C_{12}$ diamine and said diamine $(X_1)$ is chosen from meta-xylylene diamine (MXD), para-xylylene diamine (PXD), bis(aminomethyl)cyclohexane (BAC) and methylpentamethylene diamine (MPMD).

Advantageously, A is a repeating unit XY, (Y) being sebacic acid, (X) corresponds to a $C_6$ to $C_{12}$ diamine and said diamine $(X_1)$ is chosen from meta-xylylene diamine (MXD), para-xylylene diamine (PXD), bis(aminomethyl)cyclohexane (BAC) and methylpentamethylene diamine (MPMD).

Advantageously, A is a repeating unit XY, (Y) being dodecanedioic acid, (X) corresponds to a $C_6$ to $C_{12}$ diamine and said diamine $(X_1)$ is chosen from meta-xylylene diamine (MXD), para-xylylene diamine (PXD), bis(aminomethyl) cyclohexane (BAC) and methylpentamethylene diamine (MPMD).

Advantageously, A is a repeating unit XY, (Y) being a $C_6$ to $C_{12}$ aliphatic dicarboxylic acid (Y), (X) corresponds to hexamethylene diamine or decanediamine and said diamine $(X_1)$ is chosen from meta-xylylene diamine (MXD), para-xylylene diamine (PXD), bis(aminomethyl)cyclohexane (BAC) and methylpentamethylene diamine (MPMD).

Advantageously, A is a repeating unit XY, (Y) being sebacic acid or dodecanedioic acid, (X) corresponds to hexamethylene diamine or decanediamine and said diamine $(X_1)$ is chosen from meta-xylylene diamine (MXD), para-xylylene diamine (PXD), bis(aminomethyl)cyclohexane (BAC) and methylpentamethylene diamine (MPMD).

Advantageously, A is a repeating unit XY, (Y) being sebacic acid, (X) corresponds to hexamethylene diamine or decanediamine and said diamine $(X_1)$ is chosen from meta-xylylene diamine (MXD), para-xylylene diamine (PXD), bis(aminomethyl)cyclohexane (BAC) and methylpentamethylene diamine (MPMD).

Advantageously, A is a repeating unit XY, (Y) being sebacic acid, (X) corresponds to hexamethylene diamine and said diamine $(X_1)$ is chosen from meta-xylylene diamine (MXD), para-xylylene diamine (PXD), bis(aminomethyl) cyclohexane (BAC) and methylpentamethylene diamine (MPMD).

Advantageously, A is a repeating unit XY, (Y) being sebacic acid, (X) corresponds to decanediamine and said diamine $(X_1)$ is chosen from meta-xylylene diamine (MXD), para-xylylene diamine (PXD), bis(aminomethyl)cyclohexane (BAC) and methylpentamethylene diamine (MPMD). Advantageously, A is a repeating unit XY, (Y) being dodecanedioic acid, (X) corresponds to hexamethylene diamine or decanediamine and said diamine $(X_1)$ is chosen from meta-xylylene diamine (MXD), para-xylylene diamine (PXD), bis(aminomethyl)cyclohexane (BAC) and methylpentamethylene diamine (MPMD).

Advantageously, A is a repeating unit XY, (Y) being dodecanedioic acid, (X) corresponds to hexamethylene diamine and said diamine $(X_1)$ is chosen from meta-xylylene diamine (MXD), para-xylylene diamine (PXD), bis(aminomethyl)cyclohexane (BAC) and methylpentamethylene diamine (MPMD).

Advantageously, A is a repeating unit XY, (Y) being dodecanedioic acid, (X) corresponds to decanediamine and said diamine $(X_1)$ is chosen from meta-xylylene diamine (MXD), para-xylylene diamine (PXD), bis(aminomethyl) cyclohexane (BAC) and methylpentamethylene diamine (MPMD). In one embodiment, A is a repeating unit obtained from the polycondensation of a lactam or an amino acid.

Advantageously, A is a $C_6$ to $C_{12}$ lactam, particularly caprolactam or lauryl lactam.

Advantageously, A is a $C_6$ to $C_{12}$ lactam, particularly caprolactam or lauryl lactam, and said diamine $(X_1)$ is chosen from meta-xylylene diamine (MXD), para-xylylene diamine (PXD), bis(aminomethyl)cyclohexane (BAC) and methylpentamethylene diamine (MPMD).

Advantageously, A is lauryl lactam and said diamine $(X_1)$ is chosen from meta-xylylene diamine (MXD), para-xylylene diamine (PXD), bis(aminomethyl)cyclohexane (BAC) and methylpentamethylene diamine (MPMD).

Advantageously, A is caprolactam and said diamine $(X_1)$ is chosen from meta-xylylene diamine (MXD), para-xylylene diamine (PXD), bis(aminomethyl)cyclohexane (BAC) and methylpentamethylene diamine (MPMD).

Advantageously, A is a $C_6$ to $C_{12}$ amino acid, particularly 11-aminoundecanoic acid.

Advantageously, A is a $C_6$ to $C_{12}$ amino acid and said diamine $(X_1)$ is chosen from meta-xylylene diamine (MXD), para-xylylene diamine (PXD), bis(aminomethyl)cyclohexane (BAC) and methylpentamethylene diamine (MPMD).

Advantageously, A is 11-aminoundecanoic acid and said diamine $(X_1)$ is chosen from meta-xylylene diamine (MXD), para-xylylene diamine (PXD), bis(aminomethyl)cyclohexane (BAC) and methylpentamethylene diamine (MPMD).

In one embodiment, said at least one additive is chosen from fillers, colorants, stabilizers, plasticizers, surfactants, nucleating agents, pigments, whitening agents, antioxidants, lubricants, flame retardants, waxes and mixtures thereof.

The fillers may be antistatic fillers, silica, graphite, expanded graphite, carbon black, glass beads, kaolin, magnesia, slag, wollastonite, nanofillers (carbon nanotubes).

It is of course obvious that, in the present invention, the glass beads are not considered to be fiberglass with a circular cross-section and are not therefore fiberglass with a circular cross-section.

The stabilizers may be organic or inorganic stabilizers.

The plasticizers are for example an octyl ester of para-oxybenzoic acid or N-butylbenzenesulfonamide.

The antioxidants are agents that prevent thermo-oxidation and/or photo-oxidation of the polymer in the thermoplastic matrix.

Nucleating agents such as metal oxide, particles of metals, silica, alumina, clay or talc are known.

The lubricant can contain stearate or a wax binder.

The flame retardants can be a metal salt chosen from a phosphinic acid metal salt, a metal salt of diphosphinic acid, a polymer containing at least one metal salt of phosphinic acid, a polymer containing at least one metal salt of diphosphinic acid.

The waxes can particularly be an amorphous wax, such as beeswax, a silicone wax, a polyethylene wax, an oxidized polyethylene wax, an ethylene copolymer, a montan wax and a polyether wax.

According to one feature, the present invention relates to a composition for an implementation, particularly by injection, comprising:
from 25 to 65% by weight, particularly from 35 to 65% of at least one copolyamide $A/X_1Y$ as defined above,
from 35 to 75% by weight, particularly from 35 to 65% by weight of fiberglass with a circular cross-section,
from 0 to 10% by weight of at least one impact modifier,
from 0 to 2% by weight of at least one additive, the sum of the proportions of each constituent of the composition being equal to 100%.

All the characteristics defined for A, X, Y $X_1$, the fiberglass, the impact modifier and the additive in the scope of the use are valid for the composition as is.

Advantageously, cyclohexane dicarboxylic acid is excluded from the definition of the dicarboxylic aliphatic (Y) present in this composition.

Advantageously, said composition for an implementation, particularly by injection, comprises:
- from 25 to 64.9% by weight, particularly from 35 to 64.9% of at least one copolyamide $A/X_1Y$ as defined above,
- from 35 to 74.9% by weight, particularly from 35 to 64.9% by weight of fiberglass with a circular cross-section,
- from 0.1 to 10% by weight of at least one impact modifier,
- from 0 to 2% by weight of at least one additive.

Advantageously, said composition for an implementation, particularly by injection, comprises:
- from 25 to 64.9% by weight, particularly from 35 to 64.9% of at least one copolyamide $A/X_1Y$ as defined above,
- from 35 to 74.9% by weight, particularly from 35 to 64.9% by weight of fiberglass with a circular cross-section,
- from 0 to 10% by weight of at least one impact modifier,
- from 0.1 to 2% by weight of at least one additive.

Advantageously, said composition for an implementation, particularly by injection, comprises:
- from 25 to 64.8% by weight, particularly from 35 to 64.8% of at least one copolyamide $A/X_1Y$ as defined above,
- from 35 to 74.8% by weight, particularly from 35 to 64.8% by weight of fiberglass with a circular cross-section,
- from 0.1 to 10% by weight of at least one impact modifier,
- from 0.1 to 2% by weight of at least one additive.

Advantageously, the unit A of the composition for an implementation, particularly by injection, is a repeating unit XY.

Advantageously, the unit A of the composition for an implementation, particularly by injection, is a repeating unit XY, and (Y) is a $C_6$ to $C_{12}$ aliphatic dicarboxylic acid (Y), particularly corresponding to sebacic acid.

In particular, the unit (X) of the composition for an implementation, particularly by injection, corresponds to a $C_6$ to $C_{12}$ diamine, particularly hexamethylene diamine or decanediamine. In one embodiment, the unit $(X_1)$ of the composition for an implementation, particularly by injection, is chosen from bis(aminomethyl)cyclohexane (BAC), 3,3 '-dimethyl-4,4'-diamino-dicyclohexyl-methane, commonly called (BMACM) or (MACM), and bis-(p-aminocyclohexyl)-methane, commonly called (PACM).

The BAC may be 1,3-BAC or 1,4-BAC.

Advantageously, the unit $(X_1)$ of the composition for an implementation, particularly by injection, is chosen from meta-xylylene diamine (MXD), para-xylylene diamine (PXD), bis(aminomethyl)cyclohexane (BAC) and methylpentamethylene diamine (MPMD).

Advantageously, the unit A of the composition for an implementation, particularly by injection, is a repeating unit XY, (Y) being a $C_6$ to $C_{12}$ aliphatic dicarboxylic acid (Y) and said diamine $(X_1)$ is chosen from meta-xylylene diamine (MXD), para-xylylene diamine (PXD), bis(aminomethyl)cyclohexane (BAC) and methylpentamethylene diamine (MPMD).

Advantageously, the unit A of the composition for an implementation, particularly by injection, is a repeating unit XY, (Y) corresponding to sebacic acid and said diamine $(X_1)$ is chosen from meta-xylylene diamine (MXD), para-xylylene diamine (PXD), bis(aminomethyl)cyclohexane (BAC) and methylpentamethylene diamine (MPMD).

In one embodiment, (X) corresponds to a $C_6$ to $C_{12}$ diamine, particularly hexamethylene diamine or decanediamine.

Advantageously, the unit A of the composition for an implementation, particularly by injection, is a repeating unit XY, (Y) being a $C_6$ to $C_{12}$ aliphatic dicarboxylic acid (Y) and (X) corresponds to a $C_6$ to $C_{12}$ diamine.

Advantageously, the unit A of the composition for an implementation, particularly by injection, is a repeating unit XY, (Y) being a $C_6$ to $C_{12}$ aliphatic dicarboxylic acid (Y) and (X) corresponds to hexamethylene diamine or decanediamine.

Advantageously, the unit A of the composition for an implementation, particularly by injection, is a repeating unit XY, (Y) being a $C_6$ to $C_{12}$ aliphatic dicarboxylic acid (Y), (X) corresponds to a $C_6$ to $C_{12}$ diamine and said diamine $(X_1)$ is chosen from meta-xylylene diamine (MXD), para-xylylene diamine (PXD), bis(aminomethyl)cyclohexane (BAC) and methylpentamethylene diamine (MPMD).

Advantageously, the unit A of the composition for an implementation, particularly by injection, is a repeating unit XY, (Y) being sebacic acid, (X) corresponds to a $C_6$ to $C_{12}$ diamine and said diamine $(X_1)$ is chosen from meta-xylylene diamine (MXD), para-xylylene diamine (PXD), bis(aminomethyl)cyclohexane (BAC) and methylpentamethylene diamine (MPMD).

Advantageously, the unit A of the composition for an implementation, particularly by injection, is a repeating unit XY, (Y) being a $C_6$ to $C_{12}$ aliphatic dicarboxylic acid (Y), (X) corresponds to hexamethylene diamine or decanediamine and said diamine $(X_1)$ is chosen from meta-xylylene diamine (MXD), para-xylylene diamine (PXD), bis(aminomethyl)cyclohexane (BAC) and methylpentamethylene diamine (MPMD).

Advantageously, the unit A of the composition for an implementation, particularly by injection, is a repeating unit XY, (Y) being sebacic acid, (X) corresponds to hexamethylene diamine or decanediamine and said diamine $(X_1)$ is chosen from meta-xylylene diamine (MXD), para-xylylene diamine (PXD), bis(aminomethyl)cyclohexane (BAC) and methylpentamethylene diamine (MPMD).

Advantageously, the unit A of the composition for an implementation, particularly by injection, is a repeating unit obtained from the polycondensation of a lactam or an amino acid.

Advantageously, the unit A of the composition for an implementation, particularly by injection, is a repeating unit obtained from the polycondensation of a $C_6$ to $C_{12}$ lactam, particularly caprolactam or lauryl lactam.

Advantageously, the unit A of the composition for an implementation, particularly by injection, is a repeating unit obtained from the polycondensation of a $C_6$ to $C_{12}$ lactam, particularly caprolactam or lauryl lactam, and said diamine $(X_1)$ is chosen from meta-xylylene diamine (MXD), para-xylylene diamine (PXD), bis(aminomethyl)cyclohexane (BAC) and methylpentamethylene diamine (MPMD).

Advantageously, the unit A of the composition for an implementation, particularly by injection, is a repeating unit obtained from the polycondensation of lauryl lactam and said diamine $(X_1)$ is chosen from meta-xylylene diamine (MXD), para-xylylene diamine (PXD), bis(aminomethyl) cyclohexane (BAC) and methylpentamethylene diamine (MPMD).

Advantageously, the unit A of the composition for an implementation, particularly by injection, is a repeating unit obtained from the polycondensation of caprolactam and said diamine ($X_1$) is chosen from meta-xylylene diamine (MXD), para-xylylene diamine (PXD), bis(aminomethyl)cyclohexane (BAC) and methylpentamethylene diamine (MPMD).

Advantageously, A is a $C_6$ to $C_{12}$ amino acid, particularly 11-aminoundecanoic acid.

Advantageously, the unit A of the composition for an implementation, particularly by injection, is a repeating unit obtained from the polycondensation of a $C_6$ to $C_{12}$ amino acid and said diamine ($X_1$) is chosen from meta-xylylene diamine (MXD), para-xylylene diamine (PXD), bis(aminomethyl)cyclohexane (BAC) and methylpentamethylene diamine (MPMD).

Advantageously, the unit A of the composition for an implementation, particularly by injection, is a repeating unit obtained from the polycondensation of 11-aminoundecanoic acid and said diamine ($X_1$) is chosen from meta-xylylene diamine (MXD), para-xylylene diamine (PXD), bis(aminomethyl)cyclohexane (BAC) and methylpentamethylene diamine (MPMD).

Specifically, said at least one additive in the composition for implementation, particularly by injection, is chosen from fillers, colorants, stabilizers, plasticizers, surfactants, nucleating agents, pigments, whitening agents, antioxidants, lubricants, flame retardants, waxes and mixtures thereof.

According to another aspect, the present invention relates to the use of a composition as defined above to form a single-layer structure or at least one layer of a multilayer structure.

All the characteristics defined above are valid for this use.

Advantageously, said structure is presented in the form of an injected part.

The injected part may be a telephone part, particularly a telephone shell, or a part of a computer or tablet or smart watch.

According to another aspect, the present invention relates to an object obtained from a composition as defined above.

According to another aspect, the present invention relates to a process for shaping an object as defined above, characterized in that it comprises a step of injection of a composition as defined above.

According to another aspect, the present invention relates to the use of an object as defined above, in the electrical and/or electronic field.

DESCRIPTION OF THE FIGURES

FIG. 1 (A and B) shows the warping obtained with 2 plates (100*100*1 mm 3) injected by:

A: composition of the invention (same type of plate for I1 to I8)

B: composition C1, and measured as described in example 1.

A: plate injected with one of the compositions I1 to I8 (same type of plate for these different compositions) whose warping is limited and less than 1 mm, B: plate injected C1 whose warping is very important and greater than 5 mm.

EXAMPLES

Example 1: Evaluation of Warping after 7 Days of (Co)Polyamide Compositions Containing CoPA 610/1,3-BAC10, 610/1,4-BAC10, 610/MXD10, 610/PXD10, 610/MPMD10, 610/B10, and Fiberglass with a Circular Cross-Section

Synthesis

The various polyamides (comparison) and copolyamides have been prepared according to the usual techniques for polyamide and copolyamide synthesis.

Synthesis of CoPa 610/MXD10, representative of the various copolyamides: The hexamethylenediamine, m-xylenediamine and sebacic acid monomers are charged together in the reactor according to the desired mass ratio. The medium is first inerted to remove the oxygen that can generate yellowing or secondary reactions. Water can also be charged to improve heat exchange. Two temperature rise and pressure plateaus are conducted. The temperature)(T° and pressure conditions are chosen to allow the medium to melt. After having reached the maintenance conditions, degassing takes place to allow the polycondensation reaction. The medium becomes viscous little by little and the reaction water formed is caused the nitrogen purge or applying a vacuum. When the stoppage conditions are reached, related to the desired viscosity, stirring is stopped and the extrusion and granulation can start. The granules obtained will then be compounded with the fiberglass.

Compounding

The compositions were prepared by mixing the polymer granules when melted. This mixture was made by compounding on a twin-screw co-rotating MC26 extruder with a flat temperature profile (T° at 270° C. The screw rate is 250 rpm.

The introduction of the fiberglass with circular cross-section (Nittobo CSX3J451S0) is achieved by side feeding.

Injection

100*100*1 mm 3 plates were prepared by injecting the different compositions:

Injection temperature (feed/nozzle): 250/270° C.

Mold temperature: 50° C.

The cycle time is adjusted according to the compositions to allow injection of the compositions. In the case of the injection, it must be less than 50 seconds to be according to the invention.

Figure 1:
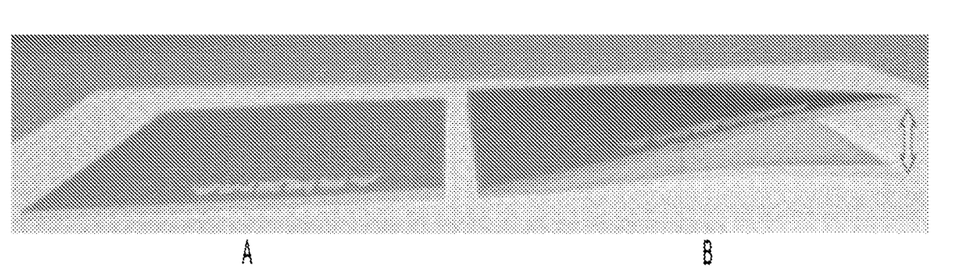

The warping was evaluated according to the method described below:

The injected plates are placed on a table. The operator presses on 3 corners of the plate to make the fourth rise. Then the difference between the surface of the table and the sample is measured; see the arrow in FIG. 1.

This measurement is made 7 days after injection. On the left-hand sample on FIG. 1 (A), the warping is limited, i.e. less than 1 mm.

Inherent Viscosity

The intrinsic or inherent viscosity is measured in m-cresol. The method is well known to the person skilled in the art. Standard ISO 307:2007 is followed but with a change of solvent (use of m-cresol instead of sulfuric acid), temperature (20° C.) and concentration (0.5% by mass). It is expressed in dL/g.

The results are shown in Table I below.

TABLE I

| Comp. | CoPA or polyamide (% by weight) | Fiberglass with a circular cross-section (% by weight) | Warping after 7 days | Cycle time |
|---|---|---|---|---|
| C1 | 610 I.V.: 0.90 | 50% | >5 mm | <50 s |
| C2 | 610/MXD10 (50/50) I.V.: 0.8 | 50% | <1 mm | >50 s |
| C3 | MXD10 I.V.: 0.85 | 50% | <1 mm | >50 s |
| I1 | 610/MPMD10 (80/20) I.V.: 0.91 | 50% | <1 mm | <50 s |
| I2 | 610/MXD10 (80/20) I.V.: 0.98 | 50% | <1 mm | <50 s |
| I3 | 610/PXD10 (70/30) I.V.: 0.95 | 50% | <1 mm | <50 s |
| I4 | 610/1.3-BAC10 (80/20) I.V.: 0.98 | 50% | <1 mm | <50 s |
| I5 | 610/1.4-BAC10 (80/20) I.V.: 0.87 | 50% | <1 mm | <50 s |
| I9 | 610/B10 (80/20) I.V.: 0.8 | 50% | <1 mm | <50 s |
| I10 | 610/B10 (70/30) I.V.: 0.8 | 50% | <1 mm | <50 s |

Comp. means composition.
Cx means comparison composition.
Ix means composition of the invention.

Example 2: Evaluation of Warping of PAH Compositions with Intrinsic Viscosity I.V.=1.08 or Copolyamide Compositions Containing PA 11 (CoPA 11/MXD10 (50/50, I.V.=0.93), 11/NIXD10 (80/20 I.V.=0.96), 11/1,3-BAC10 (80/20, I.V.=1.10) and 11/PXD10 (80/20, I.V.=1.15)

Synthesis, compounding and injection are conducted as described for example 1 with the difference that the temperature of the mold is 45° C. and the injection temperature is 260° C.

The results are shown in the following Table II:

TABLE II

| Comp. | CoPA or polyamide (% by weight) | Fiberglass with a circular cross-section (% by weight) | Warping after 7 days | Cycle time |
|---|---|---|---|---|
| C4 | 11 I.V.: 1.08 | 50% | 3 mm | <50 s |
| C5 | 11/MXD10 (50/50) (IV: 0.93) | 50% | <1 mm | >50 s |
| I6 | 11/MXD10 (80/20) I.V.: 0.96 | 50% | <1 mm | <50 s |
| I7 | 11/1.3-BAC10 (80/20) I.V.: 1.10 | 50% | <1 mm | <50 s |
| I8 | 11/PXD10 (80/20) I.V.: 1.15 | 50% | <1 mm | <50 s |

The invention claimed is:

1. A composition for producing a formed object, the composition being configured to limit warping of the object while maintaining a process cycle time, the composition comprising:
   (a) from 25 to 64.9% by weight of at least one copolyamide $A/X_1Y$, wherein:
   A is a repeating unit obtained from the polycondensation of at least one $C_6$ to $C_{12}$ lactam or of at least one $C_6$ to $C_{12}$ amino acid or at least one repeating unit XY obtained from the polycondensation of at least one $C_4$ to $C_{18}$ aliphatic diamine (X) and at least one aliphatic dicarboxylic acid (Y) selected from the group consisting of suberic acid, azelaic acid, sebacic acid, undecanedioic acid, dodecanedioic acid, brassylic acid, tetradecanedioic acid, pentadecanedioic acid, hexadecanedioic acid and octadecanedioic acid,
   $X_1Y$ is a repeating unit obtained from the polycondensation of a diamine ($X_1$) chosen from an arylamine, a cycloaliphatic diamine, or a branched aliphatic diamine, and at least one aliphatic dicarboxylic acid (Y) selected from the group consisting of adipic acid, suberic acid, azelaic acid, sebacic acid, undecanedioic acid, dodecanedioic acid, brassylic acid, tetradecanedioic acid, pentadecanedioic acid, hexadecanedioic acid and octadecanedioic acid,
   the $A/X_1Y$ ratio by weight being comprised from 60/40 to 95/5,
   (b) from 35 to 74.9% by weight of fiberglass with a circular cross-section,
   (c) optionally, from 0 to 10% by weight of at least one impact modifier,
   (d) from 0.1 to 2% by weight of at least one additive, wherein the at least one additive is selected from the group consisting of fillers, colorants, stabilizers, plasticizers, surfactants, nucleating agents, pigments, whitening agents, antioxidants, lubricants, flame retardants, and waxes.

2. The composition according to claim 1, wherein A is a repeating unit XY.

3. The composition according to claim 2, wherein X corresponds to a $C_6$ to $C_{12}$ aliphatic diamine.

4. The composition according to claim 2, wherein X is hexamethylene diamine or decanediamine.

5. The composition according to claim 1, wherein A is a repeating unit XY, and Y in unit XY is a aliphatic dicarboxylic acid selected from the group consisting of suberic acid, azelaic acid, sebacic acid, undecanedioic acid and dodecanedioic acid.

6. The composition according to claim 5, wherein Y in unit XY is sebacic acid.

7. The composition according to claim 1, wherein A is a repeating unit obtained from the polycondensation of a $C_6$ to $C_{12}$ lactam.

8. The composition according to claim 1, wherein A is a repeating unit obtained from the polycondensation of a $C_6$ to $C_{12}$ amino acid.

9. The composition according to claim 1, wherein $X_1$ is an arylamine chosen from meta-xylylene diamine (MXD) and para-xylylene diamine (PXD).

10. The composition according to claim 1, wherein $X_1$ is a cycloaliphatic diamine selected from the group consisting of bis(aminomethyl)cyclohexane (BAC), 3,3'-dimethyl-4,4'-diamino-dicyclohexyl-methane (BMACM or MACM), and bis-(p-aminocyclohexyl)-methane (PACM).

11. The composition according to claim 10, wherein said cycloaliphatic diamine is bis(aminomethyl)cyclohexane (BAC).

12. The composition according to claim 1, wherein $X_1$ is a branched aliphatic diamine selected from the group consisting of 2-methyloctanediamine (MOMD), methylpentamethylene diamine (MPMD) and trimethylhexanemethylene diamine (TMDA).

13. The composition according to claim 1, wherein $X_1$ is selected from the group consisting of meta-xylylene diamine (MXD), para-xylylene diamine (PXD), bis(aminomethyl)cyclohexane (BAC) and methylpentamethylene diamine (MPMD).

14. The composition according to claim 1, wherein the composition comprises the at least one impact modifier.

15. The composition according to claim 1, wherein the fiberglass has an L/D ratio less than 2.

16. The composition according to claim 1, wherein the composition comprises:
from 35 to 64.9% by weight of said at least one copolyamide $A/X_1Y$,
from 35 to 64.9% by weight of said fiberglass with a circular cross-section,
from 0 to 10% by weight of said at least one impact modifier,
from 0.1 to 2% by weight of said at least one additive.

17. An object comprising the composition as defined in claim 1.

18. The object according to claim 17, wherein said object is a single-layer structure or at least one layer of a multilayer structure.

19. The object according to claim 18, wherein the structure is in the form of an injected part.

20. The object according to claim 17, wherein said object is used in the electrical and/or electronics field.

* * * * *